United States Patent [19]

Inhofe, Jr. et al.

[11] Patent Number: 4,708,527

[45] Date of Patent: Nov. 24, 1987

[54] PLASTIC PILE PROTECTOR AND METHOD OF COVERING A PILE WITH SAME

[75] Inventors: James A. Inhofe, Jr., Tecumseh; Harold J. Evans, Perkins, both of Okla.

[73] Assignee: Central Plastics Company, Shawnee, Okla.

[21] Appl. No.: 21,762

[22] Filed: Mar. 4, 1987

Related U.S. Application Data

[62] Division of Ser. No. 524,559, Aug. 19, 1983.

[51] Int. Cl.$^4$ .............................. E02D 5/60; E04B 2/00
[52] U.S. Cl. ....................................... 405/216; 156/71; 156/273.9; 219/243
[58] Field of Search .............................. 405/211, 216; 52/309.15, 309.16, 514, 746; 156/71, 94, 215, 218, 273.7, 273.9, 308.4, 309.6; 219/201, 213, 227, 240, 243, 535

[56] References Cited

U.S. PATENT DOCUMENTS

| | | | |
|---|---|---|---|
| 1,947,413 | 2/1934 | Hay | 25/118 |
| 3,049,465 | 8/1962 | Wilkins | 156/272 |
| 3,139,731 | 7/1964 | Liddell | 61/54 |
| 3,181,300 | 5/1965 | Plummer | 61/54 |
| 3,448,585 | 6/1969 | Vogelsang | 61/54 |
| 3,506,519 | 4/1970 | Blumenkranz | 156/275 |
| 3,524,231 | 8/1970 | Wiswell, Jr. | 24/281 |
| 3,581,505 | 6/1971 | Liddell | 61/46 |
| 3,719,049 | 3/1973 | Shaw et al. | 61/54 |
| 3,736,759 | 6/1973 | Blose | 61/54 |
| 3,890,795 | 6/1975 | Maurer | 61/54 |
| 3,943,334 | 3/1976 | Sturm | 219/544 |
| 3,999,399 | 12/1976 | Maurer | 61/54 |
| 4,117,311 | 9/1978 | Sturm | 219/544 |
| 4,224,505 | 9/1980 | Sturm | 219/544 |
| 4,244,156 | 1/1981 | Watts, Jr. | 52/746 |
| 4,252,471 | 2/1981 | Straub | 405/211 |

FOREIGN PATENT DOCUMENTS 0076043  4/1983  European Pat. Off. .
1026223  4/1966  United Kingdom .

Primary Examiner—Nancy J. Stodola
Attorney, Agent, or Firm—Laney, Dougherty, Hessin & Beavers

[57] ABSTRACT

A device and method of covering piles and the like includes a plastic cover or sheet which is wrapped around the pile for protecting the pile against rot, weather and wear. The plastic sheet ends overlap as they wrap around the pile. The ends are sealed and secured by a heating element extending between the overlapped ends of the sheet and which forms a fused plastic seam between the overlapped ends as the sheet is held tightly about the pile. A strap and bar which presses over the heating element are provided for temporarily cinching the plastic sheet tightly about the pile and holding it while the heat fusing occurs.

6 Claims, 7 Drawing Figures

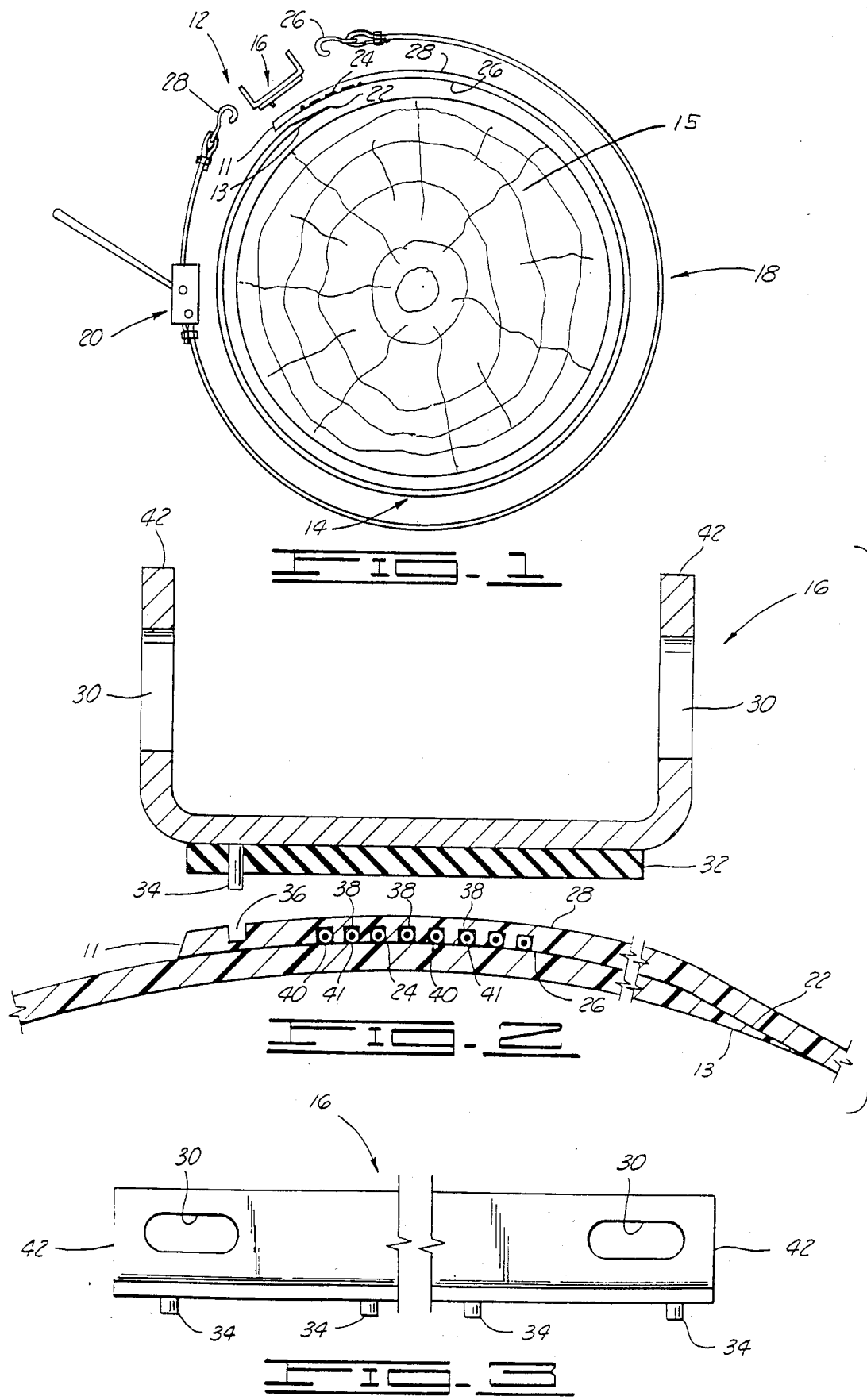

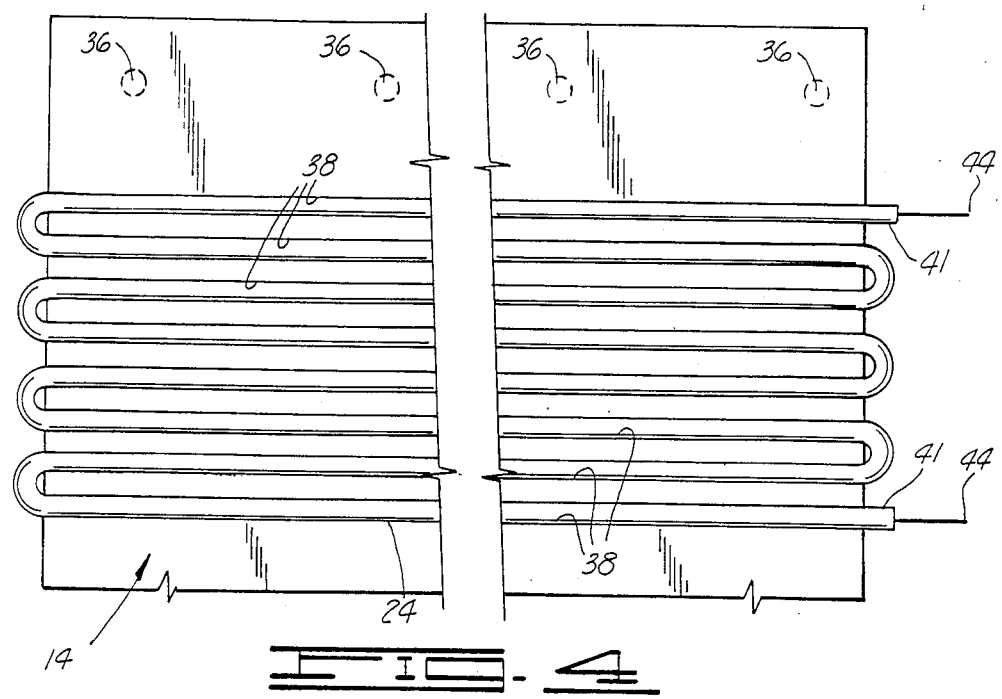
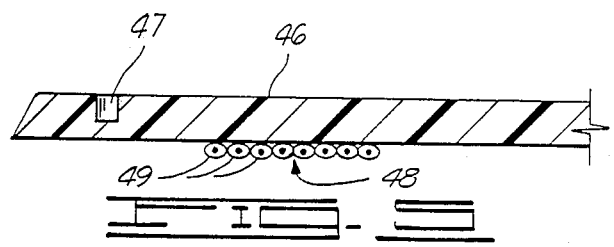
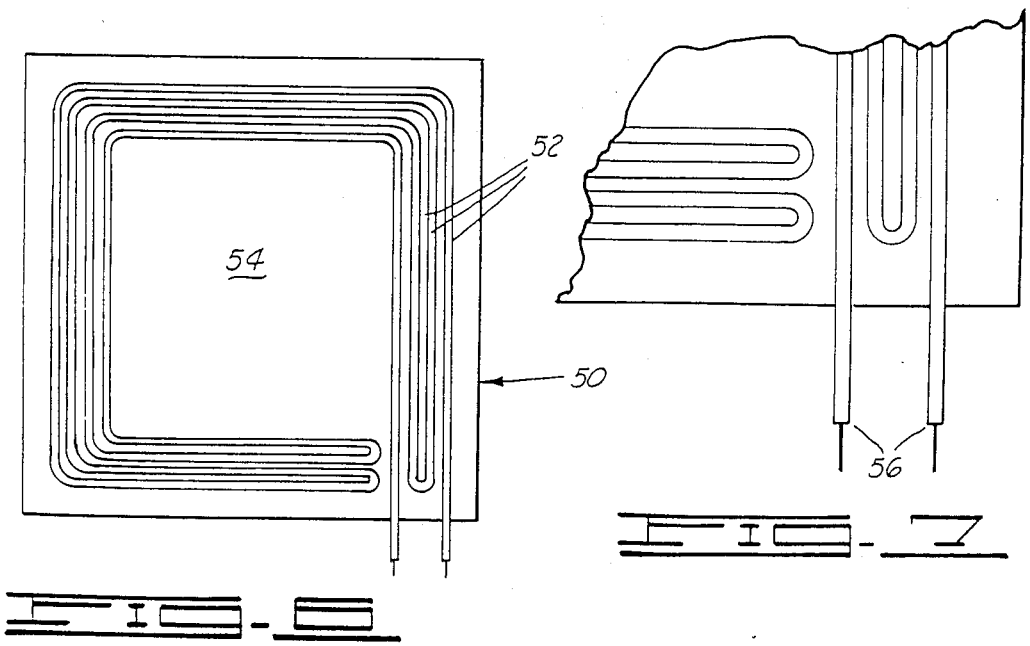

PLASTIC PILE PROTECTOR AND METHOD OF COVERING A PILE WITH SAME

This is a divisional of co-pending application Ser. No. 524,559 filed on Aug. 19, 1983.

BACKGROUND OF THE INVENTION

1. Field of the Invention

This invention relates generally to methods and apparatus for covering and thereby protecting the pilings of piers, wharfs, or other structures extending from a waterfront or free-standing in a body of water.

2. Description of the Prior Art

Piers, wharfs, quays and free standing structures utilized for the docking of vessels or as platforms in the sea are commonly supported by wooden, concrete or metal piles which extend longitudinally from immemdiately underneath the pier platform, downwardly through the water to the earth's surface therebelow. Immersion of the lower portion of a pile in seawater and exposure of the remaining portion of a pile to an inhospitable sea environment substantially diminishes a pile's useful life. Unprotected piles, in addition to being exposed to water and the elements, are susceptible to attack by marine organisms. Various worms, snails, bacteria and marine life act to destroy the integrity of wood or to corrode and destroy the metal. Further, the piles are often rammed by boat fenders, breaking the piles. Abrasion by shifting and washing sand is especially a problem for metal and concrete piles. Ultimately, the wood, concrete and metal are destroyed and the piling must be replaced. This is a very expensive and labor intensive process. Therefore, various protective measures have been employed to forstall the deterioration of piling.

Various devices and methods have been utilized in the past to protect piles. One of the oldest methods of protecting piles is to soak wooden piles with tar. However, the tar soon wears off. More recently, coverings such as zippered plastic covers, plastic covers connected by tongue and groove, plastic covers which are overlapped and spiked, and fiberglass or plastic flanged and bolted covers have been used on metal, concrete and wooden piles. These cover devices have also proven unsatisfactory. Most importantly, most pile coverings do not provide a good seal and do not prevent water, marine life and bacteria from entering the wood. While tar and mastics have been applied beneath the covers, the seawater and animal life still can penetrate the plastic cover. Ultimately, the wood, concrete and metal are penetrated and destroyed because the cover has holes punched in it by spikes or gaps are present in the flanges or cover ends.

To illustrate, one protective covering and method employed in the prior art utilizes a fiberglass cover. The fiberglass cover employed by this system is an axially flanged fiberglass split-sleeve which is tightened around a pile by bolting the axial flange together. Prior to installation of the fiberglass cover, the pile is covered with a mastic and then spirally wrapped with a coated paper to seal the surface of the pile. The fiberglass cover itself does not seal the pile surface since the pre-formed figerglass will not conform to surface imperfections and diameter changes which are present in all wooden piles, concrete piles and corroded metal piles. More mastics and caulks are applied about the cover in an attempt to further seal the pile from the water. However, the mastics and caulks wear and wash away and water and animal life attacks the pile beneath the cover.

A variation of the above method substitutes a plastic flanged split-sleeve cover in place of the fiberglass cover. A flanged cover of either fiberglass or plastic material must be custom sized to the particular metal or wooden pile to be covered or else the fit is particularly bad. Many piles are formed from tree trunks which are larger at one end causing even a custom sized cover to fit poorly. An additional problem with flanged covers is corrosion of the flanged connectors, which are usually nuts and bolts.

In addition to the naturally induced deterioration mentioned above, pile coverings are also damaged by vessels stricking or abrading their sides during docking. This is especially true of fiberglass covers which are inherently brittle and subject to cracking upon impact. Although fiberglass and plastic are relatively easily patched above water, they are difficult to patch below water. Also, damage to the flange of a fiberglass or plastic cover requires a substantial amount of labor to rebuild the damaged portion of the flange.

All of the covering and mastic application methods are made more difficult by the fact that they must sometimes be performed in the water. Divers are expensive labor and the water environment makes many tasks, which would otherwise be simple, very difficult or impossible.

SUMMARY OF THE INVENTION

It is an object of the present invention to provide a flangeless covering for piles which will conform to the surface irregularities of a pile.

It is also an object of the present invention to provide a covering for piles which will seal the surface of a pile, precluding the entrance of water or exposure to the elements.

Another object of the present invention is to provide a plastic covering for a pile having an easily joined seam which can be utilized to seal a pile after a pile is in place.

It is also an object to provide an improved method for covering a pile with a plastic protective material such that buckling of the plastic does not occur.

It is still further an object of the present invention to provide an improved method of sealing a pile with a plastic cover.

A further object of the present invention is to provide an apparatus and method for patching a damaged plastic cover on a pile.

In accordance with these objects, the present invention includes a plastic sheet, having first and second ends. The sheet is adapted to extend around a pile such that the first and second ends extend and overlap along the longitudinal length of the pile an electrical resistance heating element is disposed such that when the sheet is wrapped about a piling with the first and second ends overlapping the heating element is in position for heatably fusing the first and second ends to join the sheet in a single, sealed protective covering about the pile.

To use the protective sheet, it is cinched closely about a pile so that the ends overlap with the heating element extending longitudinally therebetween in position for sealing the sheet. The element is then heated to form a sealing seam. Preferably the heating element is an electrical resistance heating wire and heat is applied by connecting an appropriate electrical supply to the wire. A voltage of approximately 40 Volts or less of direct current is preferred for safety reasons.

The present invention also provides a method for cinching such a sheet about a pile. A sheet of the type described above is loosely extended about a pile such that the first end overlaps the second end. The first and second ends extend and overlap along the longitudinal length of the pile. A bar is placed on top of the first end. The bar is placed directly over the heating element to provide good contact for forming a sealing seam. Pins in the bar engage openings in the first end of the plastic sheet to capture the first end of the plastic sheet. A strap is attached to the bar and encircles the pile and sheet. A ratchet means is used to wind up the slack existing in the strap such that the bar is rotated toward the ratchet means drawing the first end over the second end and cinching the plastic sheet tightly around the pile without buckling. The heating element is then heated to fuse the plastic along the first and second ends where the heating element extends therebetween and to seal the plastic sheet about the pile.

A damaged plastic pile cover can be repaired by utilizing a plastic patch of the present invention. The patch comprises a patch sheet with a heating element which is disposed around the perimeter of the patch sheet. To use the patch sheet it is tightly pressed over the damaged area of a plastic pile covering and the heating element is heated to fuse the patch sheet to the plastic pile covering.

Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is an exploded plan view of the instant invention disposed around a wooden pile.

FIG. 2 is an exploded sectional view of a portion of the device shown in FIG. 1.

FIG. 3 is a partial elevation view of a bar of the present invention shown in FIG. 1.

FIG. 4 is a flattened elevation view of a plastic sheet of the present invention shown in FIG. 1.

FIG. 5 is a cross sectional view of a portion of an alternate embodiment of a plastic sheet constructed in accordance with the present invention.

FIG. 6 is a rear elevational view of a plastic patch constructed in accordance with the invention.

FIG. 7 is an enlarged partial rear elevational view of the patch of FIG. 6.

DESCRIPTION OF PREFERRED EMBODIMENTS

Referring now to FIG. 1 the fusible plastic pile protector and cinching device of the present invention is shown generally at 12 in an exploded relationship around a wooden pile 15 to be covered. The pile protector of the present invention includes a plastic sheet 14 and the cinching device includes a channel bar 16, a strap 18, and a ratchet 20 attached to the strap 18. An electrical resistance heating element 24 is disposed longitudinally along a vertically extending end 11 of sheet 14. It is connected to or disposed in an inwardly facing surface 26 of the plastic sheet 14. A surface 28 of the plastic sheet 14 faces outwardly from the pile 10 when the plastic sheet 14 is coiled around the pile 10. Opposite vertically extending end 11 is a vertically extending end 13. The end 11 overlaps end 13 so that the heating element 24 is disposed therebetween when the sheet 14 is ready to be sealed with a vertical seam by heating the element 24. The first and second ends extend and overlap along the longitudinal length of the pile. The heating element longitudinally extends between the first and second ends when the ends overlap.

The preferred material for the plastic sheet 14 of the present invention is polyehtylene. This material possesses excellent flexibility as well as the ability to conform to a surface's contours and irregularities when stretched across that surface. It also has the proper melt characteristics allowing a good seal seam to be formed when the electrical resistance heating element is heated while the plastic sheet is overlapped and pressed together.

Flexibility is especially important for wooden piles which often taper from top to bottom and, in addition, have many surface irregularities. For example, knots of wooden piles often slightly protrude from the convex surface thereof. Wooden, concrete and metal piles have surface irregularities after abrasion and various destructive forces have attacked the pile during use. Polyethylene is capable of conforming to most irregularities present in a pile as well as closely sealing any surface imperfections present therein.

The wrap of the sheet 14 together with the stretch of the polyethylene allows the sheet 14 to conform to even sharply tapered piles without the necessity of a custom designed sheet.

Referring to FIGS. 1–4, the plastic sheet 14 has a plurality of openings 36 adjacent end 11 and facing outwardly. These openings 36 extend in spaced relationship longitudinally on the plastic sheet 14. The openings 36 are provided so that the end 11 of sheet 14 can be captured and drawn tight during cinching of the sheet 14 about a pile.

Spaced tangentially inwardly from the openings 36 of the plastic sheet 14 is a series of parallel vertically extending channels 38. These channels 38 can be fabricated through a molding or extruding process when the plastic sheet 14 is manufactured or by machining after the plastic sheet 14 is fabricated. The channels 38 retain a wire 40 wound in series to form the electrical resistance heating element 24 and extend longitudinally from top end to bottom end on the inwardly facing surface 26 of the plastic sheet 14. Preferably the wire 40 should be tightly retained when pressfitted into the channels 38.

The channel bar is an elongated generally U-shaped member and is preferably manufactured of milled, extruded aluminum. The outwardly extending arms 42 of the channel bar 16 are perforated by axially extending slots 30, with the slots being disposed near both the top and bottom end of the channel bar 16. The channel bar 16 is used in cinching the plastic sheet 14 about a pile 15 and in pressing the overlapped ends 11 and 13 together during the formation of a longitudinal seam. The slots 30 are for connecting the strap 18 to the channel bar 16.

The channel bar 16 has a pad 32 affixed to the surface facing the plastic sheet 14 and extends along the entire length of the channel bar 16. The pad 32 is preferably elastomeric so as to resiliently press the overlapped ends 11 and 13 of the sheet 14 together preventing any gaps despite surface irregularities in the pile 15. The pad 32 can be made of neoprene rubber.

A plurality of pins 34, for engaging the openings 36 in the plastic sheet 14 extend through the pad 32 and are fixedly connected to the channel bar 16. The pins 34 are axially spaced along the length of the channel bar 16 such that the pins 34 will engage and mate with the openings 36 in the plastic sheet 14. This allows the bar 16 to capture the end 11 of the sheet 14.

The electrical resistance heating element 24 is comprised of a single wire 40 disposed in the parallel channels 38 of the plastic sheet 14. The single wire 40 comprising the electrical resistance heating element 24 has insulation 41 of polyethylene, also the material of which the plastic sheet 14 is composed. This provides a good sealing seam to form upon heating.

With respect to most polyethylene sheets and other plastic sheets it is desirable to buff the surface where melting and flowing are to occur. This removes surface materials and promotes a better seam when melted.

The single wire 40 of the electrical resistance heating element 24 is looped in a sinusoidal pattern through the channels 38 such that the pair of ends 44 thereof exit the plastic sheet 14 in parallel spaced relation. The number of loops determines the width of the element. When the plastic sheet 14 is coiled about a pile 15 the element 24 will be interposed between the overlapping inner surfce 26 and outer surface 28. The areas of melt should be prepared by buffing.

Connection of the leads 44 to an appropriate current supply will produce heat to melt and flow the plastic sheet 14 and the plastic wire insulation 41 thereby connecting the plastic sheet 14 around the pile 15. A sealing seam is formed at the element location.

In some applications it is desirable to have more than one heating element. Obviously, two or three parallel heating elements will provide a stronger seal and seam connection than one.

The plastic sheet 14 is held tightly in place during heating of the electrical resistance heating element 24 by strap 18. Strap 18 includes a first hook 26 and a second hook 29 for attaching the strap 18 to the channel bar 16 at the slots 30. The strap 18 encircles the pile 15 and the plastic sheet 14 loosely coiled thereabout.

The strap 18 has attached to it a ratchet 20 for collecting the strap and reducing the circumference of the strap 18 as it encircles the pile 15 and the plastic sheet 14. The ratchet has a hand lever 43 for hand operation of the ratchet and a mechanism for allowing the strap to be released or the ratchet reversed. The ratchet 20 should be located near the channel bar 16 on the side of the sheet which is under the overlapped end to help prevent buckling of the sheet 14.

In use, the plastic sheet 14 is coiled around the pile 15 such that the end 13 is overlapped by the end 11. The coiling can be performed by hand or the sheet 14 can be precoiled so that it will be retained by its own resiliency. It should be noted that in order to completely protect the pile 15 the plastic sheet should extend from the top of the pile to the sea floor or below. By trimming the plastic sheet 14, prior to or during installation, to conform to the length of the pile, a standard sized sheet can be used. It is important to remember that the wire 40 of the heatable element 24, which is closely fitted into the channels 38 of the plastic sheet 14 must be removed prior to trimming the plastic sheet 14 and reinserted in the channels 38 upon completion of the trimming.

It should also be noted that it is sometimes desirable to prepare the piling surface to be covered prior to covering. Such preparation can include mastics and wraps and paints as are well known to the prior art. One significant advantage of this invention, however, is that the covering is so tight and sufficiently sealed that less or even no preparation may be requried to achieve the protection provided by other processes and covering devices utilized in the past.

Once the plastic sheet 14 is wrapped around the pile 15, the electrical resistance heating element 24 will be disposed between the overlapped ends. The openings 36 will be facing outwardly on the overlapped end 11.

With the sheet wrapped about the pile 15, the pins 34 of the channel bar 16 should be aligned with and inserted into openings 36. The pad 32 of the channel bar 16 thereby covers the overlapped portion at the electrical resistance heating element 24. The first hook 26 and second hook 29 of the strap 18 are hooked in opposing slots 30 of the channel bar 16.

In most uses the bar 16 will have at least two sets of opposing slots 30 and at least two (top and bottom) straps will be used. This provides good pressure and cinching all along the sheet 14.

In some applications the pins 34 and the openings 36 are unnecessary to obtain tight cinching without buckling. The plastic thickness and the size of the pile are relevant to this determination.

The strap 18, when hooked to the channel bar 16, encircles the pile 15 and the loosely wrapped sheet 14. The hand ratchet mechanism 20, attached to the strap 18, is operated to reel in the strap 18, thereby pulling second hook 29 toward (counterclockwise in FIG. 1) ratchet 20. This motion of the hook 29 causes the channel bar 16 to which hook 29 is attached to move the overlapped end 11 over the end 13. In this manner, the end 11 slides over the end 13 until the plastic sheet 14 is tightly cinched around the pile 15.

The second end 13 of the plastic sheet 14 is tapered on its outer surface for facilitating the sliding motion of said first end 11 thereon during tightening of the plastic sheet 14. This taper also prevents a gap from being formed at the overlap.

The method of tightening described above gradually cinches the plastic sheet 14 around the pile 15 without buckling the plastic sheet 14. Because the amount of overlap can vary from pile to pile and longitudinally along a single pile, this method and device enables the installation of a standard size of plastic sheet on piles of various lengths and diameters and single piles of varying diameter.

Once the plastic sheet 14 is tightly in place on the pile 15, it is fixed in place by fusing the overlapped ends 11 and 13. This is achieved by attaching the leads 44 of the wire 40 to an electrical power source. The resistance of the wire 40 to the electrical current causes the wire to heat to a temperature sufficient to melt and flow the insulation and the plastic sheet 14 forming a bridging and sealing seam between the overlapped ends of the sheet 14.

After the seam is formed, the power source is disconnected and the seam is allowed to cool and harden. The straps 18 are then removed.

If desired, caulk can be added to the top and bottom ends of the sheet 14 to help seal the pile 15. Also, if desired, caulk can be applied to further seal the bridging seam formed. In some instances, however, neither of those will be required because of the tight fit of the sheet and the integrity of the bridging seam.

The wire 40 of which the heatable element 24 is formed, is preferably comprised of a wire having a uniform resistance per unit of lineal measure. Current flow against the resistance of the wire 40 sufficient to locally melt the plastic insulation of the wire 40 and the plastic sheet 14, particularly in the area of the channels 38, can be calculated according to the length of wire used and the power source used. Preferably the power source is 40 volts direct current or less to reduce the danger of injurious shock to personnel in the water environment.

Referring now to FIG. 5, an alternative embodiment of the sheet 14 and element 24 is shown. In many instances this embodiment is preferred for its ease of manufacture and superiority of bridging seam. In this embodiment the overlapping end of a plastic sheet 46 is provided with a protruding electrical resistance heating element 48. To fix the element 48 on the sheet 46, a wire 49 with a polyethylene insulation is serially wound inside a wooden mold channel (not shown). This wire and mold are then properly positioned and pressed against the plastic sheet 46 and current is flowed through the wire 49 to fuse the wire to itself and to the sheet 46. The ends of the wire 49 are left protruding as in the first described embodiment.

If desired this fixation of the element 48 to the sheet 46 can be done at the site of installation after trimming of a sheet 46 to size. The holes 47 can, if desired be drilled in the field to mate with pins in a bar such as bar 16. Or, as described above, the pins and holes can be omitted.

Referring now to FIGS. 6 and 7, the present invention includes an apparatus and method for patching a plastic cover on a pile. The patch of the instant invention is comprised of a plastic material, preferably the same material as the material to be patched, e.g. polyethylene. The patch has an inner or sealing surface 54 in which a heating element 52 is embedded or affixed. The heating element element 52 is a single wire wound serially. The method of embedding or affixing the wire is the same as the embodiment described above. The heatable element 52 tracks the perimeter of the patch in parallel spaced relation. The leads 56 of the heating element exit the patch in parallel spaced relation.

The patch of the instant invention is easy to install through use of the following method. First, the pitch is placed with its inner surface 54 in contact with the pile cover over the damaged area to be repaired. The patch should be placed over the damaged area such that the heating element 52 thereof completely surrounds the damaged area of a pile cover. Once the patch is properly placed, a bar and strap can be used to apply sufficient pressure to provide a good seal upon applying current to melt and flow the plastic around the heating element. The bar, of course, would be sized and shaped to fit the patch. The bar and strap can be removed after the bridging seam has cooled.

Although a wide range of parameters can accommodate the concepts of this invention, a typical plastic sheet or patch would be 0.5 centimeters thick, 200 centimeters wide, and 250 centimeters high. The wire for the heating strip would typically be 60 alloy copper wire with a 1 mm core and a length of 12 meters. Fusion time would typically be 3 to 10 minutes. The strip width would typically be 1 to 2 inches. The melt and flow temperatures for most plastics are in the range of 350° F. to 600° F.

The present invention incorporates features which render it inherently advantageous in construction and use over the prior art. For example, use of a plastic sheet instead of a flanged, split-sleeve cover greatly increases efficiency in the field in that a single size of plastic sheet is adaptable to various pilelengths and diameters. In addition, the use of a plastic sheet which is tightened around a pile and remains so, reduces or eliminates the need present in the prior art to coat the pile to be covered with a mastic and to spirally wrap the same with heavy paper to provide an effective seal for a pile surface. The channel bar 16, strap 18, and ratchet 20 provides structure well suited to tighten a plastic sheet around a pile such that minor imperfections and irregularities of the pile are sealed.

Another important feature of the instant invention is the means by which the plastic sheet 14 is permanently sealed around the pile 15. As disclosed above a heating element, when heated, forms a strong and sealing bond between the overlapping ends of the sheet. The method of installation is fast and simple.

Another feature of the instant invention is the ability to patch damaged plastic covers for piles. The zippers, flanges, an spike fastening of the prior art are, in many instances, incapable of fastening a plastic patch over a damaged portion of the plastic pile cover. The present invention provides a clean patch and a good seal and is easily applied.

Thus, the methods and apparatus of the present invention are well suited to achieve the objects and advantages mentioned as well as those inherent therein. While presently preferred embodiments of the invention have been described for the purpose of this disclosure, numerous changes in the construction and arrangement of parts and the steps of the methods can be made by those skilled in the art, which changes are encompassed within the spirit of this invention as defined by the appended claims.

The foregoing disclosure and the showings made in the drawings are merely illustrative of the principles of this invention and are not to be interpreted in a limiting sense.

What is claimed is:

1. An apparatus for covering a pile comprising:
   a plastic sheet having an inner and outer surface and a first and second end, said plastic sheet having a shape for extending closely about a pile such that said first and second ends extend and overlap along the longitudinal length of said pile;
   an electrical resistance heating element disposed on said plastic sheet in a position such that when said first and second ends overlap said heating elment longitudinally extends therebetween;
   means for heating said heating element such that said first and second ends are fused together and a bridging and sealing seam is formed between said first and second ends to hold and seal said plastic sheet about said pile.

2. The device of claim 1 further comprising:
   means for cinching and temporarily retaining said plastic sheet around said pile, including a strap for tightening said sheet around said pile and a bar attached to said strap for pressing said first and second ends together where said element extends therebetween.

3. The device of claim 1 wherein:
   said heating element comprises an electrical resistance heating wire having insulating material attached thereto.

4. An apparatus for covering a pile with a plastic material comprising:

a plastic sheet having an inner and outer surface and a first and second end, said plastic sheet having a shape for extending closely around a pile such that said first and second ends extend and overlap along the longitudinal length of said pile; an electrical resistance heating element disposed on said plastic sheet in a position such that when said first and second ends overlap said heating element longitudinally extends therebetween;

a bar for pressing said first and second ends together where said heating element extends therebetween;

strap means attached to said bar for encircling said plastic sheet;

ratchet means for drawing tight said strap means about said plastic sheet and said pile such that said plastic sheet is cinched tight about said pile; and electrical power supply means for supplying current to and heating said heating element such that said first and second ends are fused together and a bridging and sealing seam is formed between said first and second ends to hold and seal said plastic sheet about said pile.

5. The apparatus of claim 4 wherein:
said plastic sheet is formed of ethylene.
6. The apparatus of claim 4 wherein:
said electrical resistance heating element is a single serially wound wire having a plastic insulation which can melt and flow in forming said bridging and sealing seam.

* * * * *

UNITED STATES PATENT AND TRADEMARK OFFICE
CERTIFICATE OF CORRECTION

PATENT NO. : 4,708,527

DATED : November 24, 1987

INVENTOR(S) : James A. Inhofe, Jr. and Harold J. Evans

It is certified that error appears in the above-identified patent and that said Letters Patent are hereby corrected as shown below:

Column 2, line 15, delete the word "stricking" and substitute the word --striking-- therefor;

Column 2, line 54, insert a period after the word "pile" and capitalize the word "an";

Column 4, line 9, delete the word "polyehtylene" and substitute the word --polyethylene-- therefor;

Column 6, line 64, delete the word "those" and substitute the word --these-- therefor;

Column 7, line 43, delete the word "pitch" and substitute the word --patch-- therefor; and Column 8, line 48 (claim 1), delete the word "elment" and substitute the word --element-- therefor.

Signed and Sealed this

Fourteenth Day of February, 1989

*Attest:*

DONALD J. QUIGG

*Attesting Officer*    *Commissioner of Patents and Trademarks*